United States Patent
Alfred

[19]

[11] Patent Number: 6,105,811
[45] Date of Patent: Aug. 22, 2000

[54] ERGONOMIC COOKING PAN COVER

[76] Inventor: Greg Alfred, 22264 Anasazi Way, Golden, Colo. 80401

[21] Appl. No.: 09/354,863

[22] Filed: Jul. 29, 1999

[51] Int. Cl.[7] .................................................. B65D 51/16
[52] U.S. Cl. ...................... 220/369; 220/367.1; 220/912; 220/287
[58] Field of Search .............................. 220/287, 367.1, 220/369, 912, 573.1

[56] References Cited

U.S. PATENT DOCUMENTS

| | | | |
|---|---|---|---|
| 534,138 | 1/1895 | Cleary | 220/369 X |
| 1,032,212 | 7/1912 | Hilton | 220/912 X |
| 1,334,930 | 3/1920 | Chadwick | 220/912 X |
| 1,335,645 | 3/1920 | Benson | 220/367.1 X |
| 2,385,594 | 9/1945 | Witte, Jr. | 220/367.1 X |
| 2,510,196 | 6/1950 | Willette | 220/369 |
| 2,636,636 | 4/1953 | Smith | 220/369 |
| 2,664,169 | 12/1953 | Misener et al. | 220/369 X |
| 2,760,672 | 8/1956 | Cronheim | 220/369 X |
| 2,907,467 | 10/1959 | Machate, Jr. | |
| 3,102,661 | 9/1963 | Lundquist | 220/367.1 X |
| 4,198,040 | 4/1980 | Colasent | |
| 4,828,140 | 5/1989 | Henderson | 220/369 |
| 5,555,994 | 9/1996 | Chen | 220/287 |

FOREIGN PATENT DOCUMENTS

| | | | |
|---|---|---|---|
| 1119704 | 4/1939 | France | 220/367.1 |
| 429891 | 1/1948 | Italy | 220/367.1 |
| 504384 | 4/1939 | United Kingdom | 220/369 |

*Primary Examiner*—Stephen K. Cronin
*Assistant Examiner*—Robin A. Hylton
*Attorney, Agent, or Firm*—Edwin H. Crabtree; Ramon L. Pizarro; Donald W. Margolis

[57] ABSTRACT

An ergonomic cooking pan cover designed for fitting on and covering the top of various sizes of pots, pans and skillets for venting steam and preventing boil-over. The cooking pan cover includes a concave shaped cooking lid with an ergonomic handle. The ergonomic handle includes an upwardly extending knob mounted on top of an annular shaped knob base. The knob is used for gripping and lifting the pan cover. Around an outer circumference of the knob base are a plurality of downwardly extending base posts. The base posts are attached to a portion of the cooking lid. The concave shaped cooking lid includes a series of downwardly extending step-down rings. The rings are designed to center the cooking lid on the sides of the top of standard size cooking utensils from 6 to 12 inches in diameter. A center of the cooking lid is characterized by a raised central member with a closed top portion and an annular steam vent ring therearound. The steam vent ring is angled from the horizontal and includes a plurality of vent holes therein for venting steams and boil-over. The annular steam vent ring with vent holes direct the steam and boil-over outwardly between the bottom of the knob base and the top of the cooking lid thereby reducing the heating of the handle when lifting the cooking pan cover during a cooking operation. The annular shaped knob base is sized to cover the raised central member and the annular steam vent ring with the knob base acting as a splash guard during a boil-over.

11 Claims, 2 Drawing Sheets

ERGONOMIC COOKING PAN COVER

BACKGROUND OF THE INVENTION (a) Field of the Invention

This invention relates to an ergonomic cooking pan cover and more particularly, but not by way of limitation, to a cooking pan cover having a concave shaped cooking lid with an ergonomic handle designed to protection the hand of the user when steam is vented or a boil-over occurs during a cooking operation.

(b) Discussion of Prior Art

In U.S. Pat. No. 4,828,140 to Henderson a cooking lid cover is disclosed having a concave shaped lid with a smooth dished configuration. The concave lid includes a central zone with perforations therein. The central zone is designed to be lower than the remainder of the lid. Also, in U.S. Pat. No. 2,907,467 to Machate, Jr. a concave shaped cooking lid is disclosed. In U.S. Pat. No. 2,760,672 to Cronheim a vent cover is illustrated and used for different sizes of cooking pans. The vent cover of Cronheim also includes a series of step-like ledges for fitting on different diameters of cooking vessels. In U.S. Pat. No. 4,198,040 to Colasent, an adjustable lid is described having a concave configuration with the lid designed for fitting on different diameters of cooking pans.

None of the above mentioned cooking lids and cover disclose the particular combination of structure, function and advantages of the subject ergonomic cooking pan cover as described herein.

SUMMARY OF THE INVENTION

In view of the foregoing, it is a primary object of the to provide a cooking pan cover with a concave shaped cooking lid with step-down rings which is readily adaptable to various sizes of pots, pans and skillets for a close fit on top of the cooking vessel and for venting steam and preventing boil-over from around the sides of the cooking vessel.

Another object of the cooking pan cover is the cooking lid includes a raised central member with an annular steam vent ring with a plurality of holes. The holes direct the steam and boil-over, should it occur, outwardly away from the bottom of the handle helping reduce the heating of the handle when lifting the cooking pan cover during a cooking operation.

Still another object of the invention is the cooking pan cover includes an ergonomic handle with a knob base sized to cover the raised central member portion and the annular steam vent ring. The knob base acts as a splash guard when steam is vented from the cooking pan or during a boil-over.

Yet another object of the cooking pan cover is the handle knob is not connected directly to the cooking pan lid. The knob is connected to a knob base with a plurality of base posts attached to an outer circumference of the knob base. In this manner, heat from the cooking lid is prevented from being conducted directly to the knob during a cooking operation.

Still another object of the invention is any boil-over will be vented first through the holes in a steam vent ring in a raised central member of the cooking lid rather than around the sides of the cooking vessel. This feature reduces the chance of any boil-over from spilling over the top of the sides of cooking vessel and onto a stove.

The cooking pan cover includes a concave shaped cooking lid with an ergonomic handle. The ergonomic handle includes an upwardly extending knob mounted on top of an annular shaped knob base. The knob is used for gripping and lifting the pan cover. Around an outer circumference of the knob base are a plurality of downwardly extending base posts. The base posts are attached to a portion of the cooking lid. The concave shaped cooking lid includes a series of downwardly extending step-down rings. The rings are designed to center the cooking lid on the sides of the top of standard size cooking utensils from 6 to 12 inches in diameter. A center of the cooking lid is characterized by a raised central member having a closed top portion and an annular steam vent ring therearound. The steam vent ring is angled from the horizontal and includes a plurality of vent holes therein for venting steams and boil-over. The annular steam vent ring with vent holes direct the steam and boil-over outwardly between the bottom of the knob base and the top of the cooking lid thereby reducing the heating of the handle when lifting the cooking pan cover during a cooking operation. The annular shaped knob base is sized to cover the raised central member and the annular steam vent ring with the knob base acting as a splash guard during a boil-over.

These and other objects of the present invention will become apparent to those familiar with different types and designs of cooking lids and covers when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
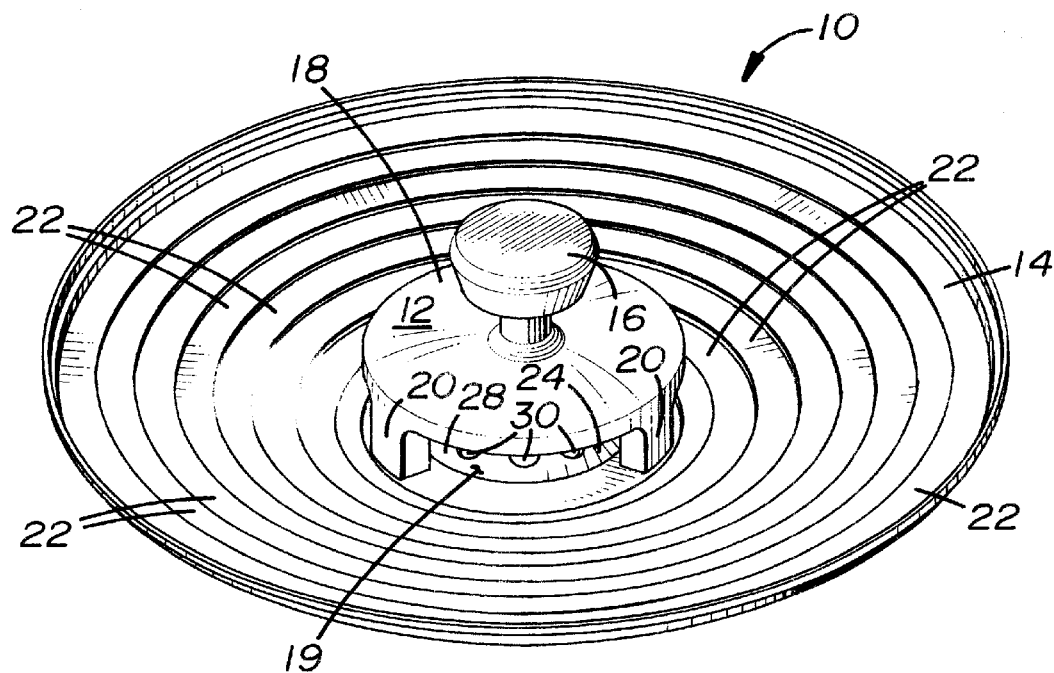
FIG. 1 is an upper perspective view of the subject cooking pan cover. In this view, the cooking pan cover is shown with an ergonomic handle mounted above a raised central member in a concave shaped cooking lid. The cooking lid is shown with a series of downwardly extending step-down rings.

In FIG. 1, an upper perspective view of the subject cooking pan cover is illustrated having a general reference numeral 10. The cooking pan cover 10 broadly includes an ergonomic handle 12 attached to the top of a concave shaped cooking lid 14.

Figure 2:
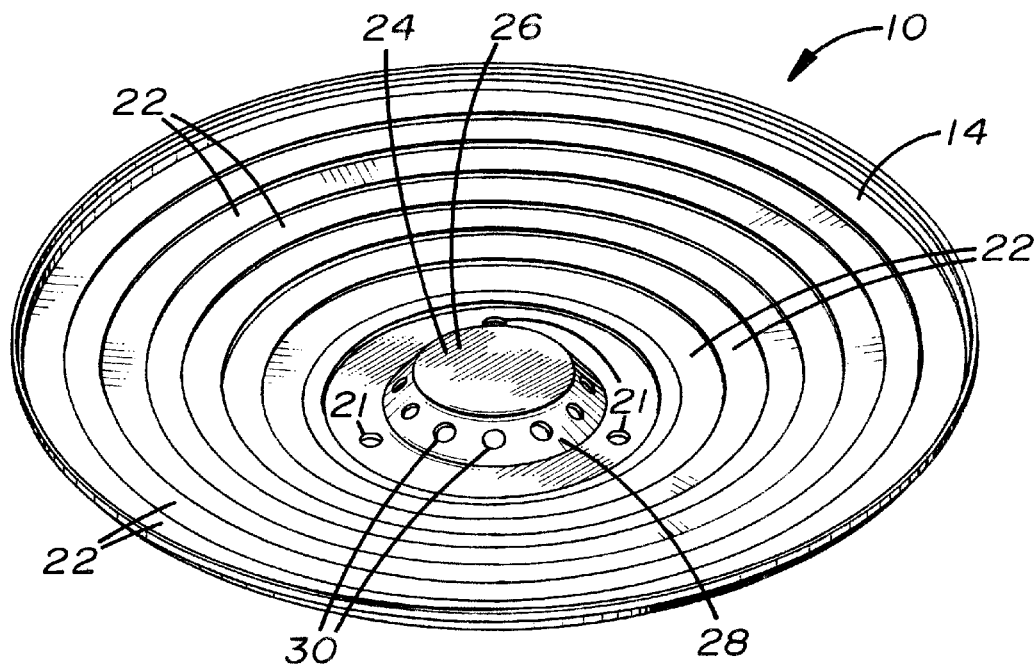
FIG. 2 is a lower perspective view of the cooking pan cover illustrating the step-down rings and the raised central member with an annular steam vent ring with a plurality of vent holes therearound.

The ergonomic handle 12 is characterized by having a raised knob 16 which is used by the user of the cooking pan cover 10 to grip and lift the cover 10. The knob 16 is centered on and attached to the top of an annular knob base 18. The knob base 18 includes three downwardly extending base posts 20. The base posts 20 are spaced around the outer circumference of the knob base 18. The base posts 20 hold the bottom of the knob base 18 above the cooking lid 14 with a space 19 therebetween. The bottom of the base posts 20 are threaded for receiving screws or other types of fasteners for securing the handle 12 to the top of the cooking lid 14. The screws or fasteners are not shown in the drawings. Fastener holes 21 in the cooking lid 14 are shown in FIG. 2 for receiving the screws or fasteners therethrough. While the knob base 18 is shown with three base posts 20 for stability, two, four or more posts can be used equally well.

The concave shaped cooking lid 14 is characterized by a series of downwardly extending step-down rings 22. The step-down rings 22 are designed to center the cooking lid 14 on the sides of the top of standard size cooking utensils from 6 to 12 inches in diameter. A center of the cooking lid 14 includes a raised central member 24 with a closed top portion 26 and an annular steam vent ring 28 therearound. The closed top portion 26 can be seen clearly in FIGS. 2–4. The steam vent ring 28 is angled from the horizontal and includes a plurality of vent holes 30 therein for venting steams and boil-over.

It should be noted that by the design of the subject cooking pan cover 10, the step-down rings 22 provide a snug fit round different diameter cooling pans, pots and skillets. Also, since the cooking lid cover is concave, any steam or boil-over will be vented first through the holes 30 in the steam vent ring 28 rather than around the top of the sides of the cooking vessel thereby reducing the chances of any boil-over from spilling over the sides of cooking vessel and onto a stove.

In FIG. 2, a lower perspective view of the cooking pan cover 10 is shown illustrating the series of step-down rings 22 which form the concave shaped cooking lid 14. In this view, the raised central member 24 is shown the flat closed top portion 26 and the annular steam vent ring 28 with the vent holes 30 therearound.

Figure 3:
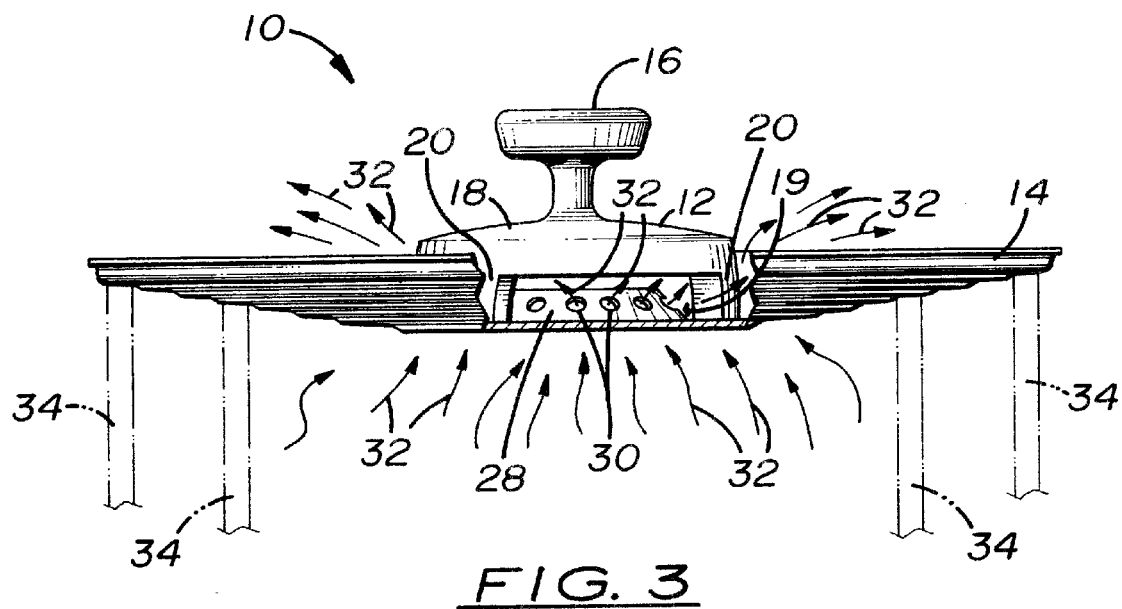
FIG. 3 is a side view of the cooking pan cover with a portion of the cooking lid cut-away to illustrate steam moving upward from a cooking pan, through the vent holes in the annular steam vent ring and outwardly from the sides of the knob base.

In FIG. 3, a side view of the cooking pan cover 10 is shown. In this view, a portion of the cooking lid 14 has been cut-away to illustrate steam or boil-over, shown as arrows 32, moving upward from a cooking pan, through the vent holes 30 in the annular steam vent ring 28, through space 19 and outwardly from the sides of the knob base 18. In this drawings, sides of two different diameter cooking pans are shown in dashed lines 34. For example, the larger pan could have a diameter of 12 inches while the smaller pan could have a diameter of 10 inches. As mentioned above, the step-down rings 22 are designed to engage the sides of different diameter pots, pans and skillets.

Figure 4:
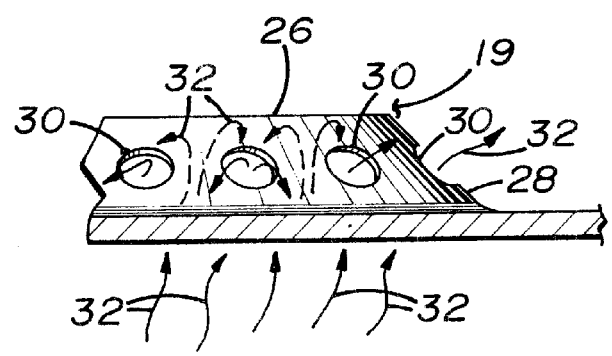
FIG. 4 is an enlarged view of a portion of the raised central member of the cooling lid is shown illustrating the travel of steam through the vent holes and outwardly away from the raised central member.

In FIG. 4, an enlarged view of a portion of the raised central member 24 is shown illustrating the travel of the steam or boil-over 32 upwardly into the raised central member 24 where the steam or boil-over, shown in dashed arrows 32 and engage the flat closed top portion 26. The steam or boil-over 32 is then redirected through the vent holes 30 and outwardly away from the raised central member 24. The annular steam vent ring 28 with vent holes 30 direct the steam and boil-over outwardly through space 19 between the bottom of the knob base 18 and the top of the cooking lid 14.

The cooking pan cover 10 is described herein as being ergonomic in that the heating of the handle 12 is greatly reduced by redirecting the flow of steam and boil-over away from the knob 16 during a cooking operation. Also, the annular shaped knob base 18 is sized to cover the raised central member 24 and the annular steam vent ring 28. In this manner, the knob base 18 acts as a splash guard during the venting of steam or boil-over thereby protecting the hand of the user when gripping and lifting the pan cover 10. Further, it should be mentioned that most cooking pans have a handle with the bottom of the handle connected directly to a metal cooking lid. This direct connection allows for heat transfer from the cooking pan directly to the handle which quite often requires a pot holder for lifting the cooking pan. In the subject invention, since the annular knob base 18 includes base posts 20 on its outer circumference, there is no direct connection of the bottom of the knob 16 to the top of the cooking lid 14. This feature along with the features mentioned above provide for a cooler handle 12 when using the cooking pan cover 10 during a typical cooking operation.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An ergonomic cooking pan cover designed for fitting on and covering the top of various sizes of pots, pans and skillets for venting steam and preventing boil-over, the cooking pan cover comprising:

an ergonomic handle, said handle having a knob mounted on top of a knob base;

a concave shaped cooking lid, said knob base attached to a portion of said cooking lid; and a raised central member formed in a center of said cooking lid, said raised central member having an annular steam vent ring therearound, said steam vent ring having at least one opening therein, said opening adapted for venting steam and boil-over outwardly from said knob base, said raised central member including a closed top portion with said steam vent ring angled upwardly from the horizontal and with an upper portion of said steam vent ring attached to said closed top portion.

2. The cooking pan cover as described in claim 1 wherein said knob base is dimensioned to cover said raised central member.

3. The cooking lid as described in claim 1 wherein said knob extends upwardly from said knob base, said knob base is annular in shape and having a plurality of downwardly extending base posts disposed around an outer circumference of said knob base, said knob posts attached to a portion of said cooking lid.

4. The cooking lid as described in claim 1 wherein said concave shaped cooking lid includes a series of downwardly extending step-down rings, said step-down rings adapted for centering said cooking lid on sides of the top of the cooking pan.

5. An ergonomic cooking pan cover designed for fitting on and covering the top of various sizes of pots, pans and skillets for venting steam and preventing boil-over, the cooking pan cover comprising:

an ergonomic handle, said handle having a knob mounted on top of an annular shaped knob base;

a concave shaped cooking lid, said knob base attached to a portion of said cooking lid; and a raised central member centered on said cooking lid, said raised central member having an annular steam vent ring therearound, said steam vent ring having a plurality of vent holes adapted for venting steam and boil-over outwardly between a bottom of said knob base and a portion of a top of said cooking lid, said raised central member including a closed top portion with said steam vent ring angled upwardly from the horizontal and with an upper portion of said steam vent ring attached to said closed top portion.

6. The cooking pan cover as described in claim 5 wherein said annular knob base is dimensioned to cover said raised central member.

7. The cooking lid as described in claim 5 wherein said knob extends upwardly from said knob base, said knob base having a plurality of downwardly extending base posts disposed around an outer circumference of said knob base, said base posts attached to a portion of said cooking lid.

8. The cooking lid as described in claim 5 wherein said concave shaped cooking lid includes a series of downwardly extending step-down rings, said step-down rings adapted for centering said cooking lid on sides of the top of the cooking pan.

9. The cooking lid as described in claim 5 wherein said knob extends upwardly from said knob base, said knob base includes at least two downwardly extending base posts disposed around an outer circumference of said knob base, a bottom of said base posts attached to a portion of said cooking lid.

10. An ergonomic cooking pan cover designed for fitting on an covering the top of various sizes of pots, pans and skillets for venting steam and preventing boil-over, the cooking pan cover comprising:

an ergonomic handle, said handle having an upwardly extending a knob mounted on top of knob base, said knob adapted for gripping and lifting the pan cover, said knob base having a plurality of downwardly extending base posts;

a concave shaped cooking lid having a series of downwardly extending step-down rings, said step-down rings adapted for centering said cooking lid on sides of the top of the cooking pan, said base posts attached to a portion of said cooking lid; and a raised central member centered on said cooking lid, said raised central member having a closed top portion and an annular steam vent ring therearound, said steam vent ring angled from the horizontal and having a plurality of vent holes adapted for venting steam and boil-over outwardly from a space between a bottom of said knob base and a portion of a top of said cooking lid.

11. The cooking pan cover as described in claim 10 wherein said knob base is annular in shape and dimensioned to cover said raised central member.

* * * * *